UNITED STATES PATENT OFFICE.

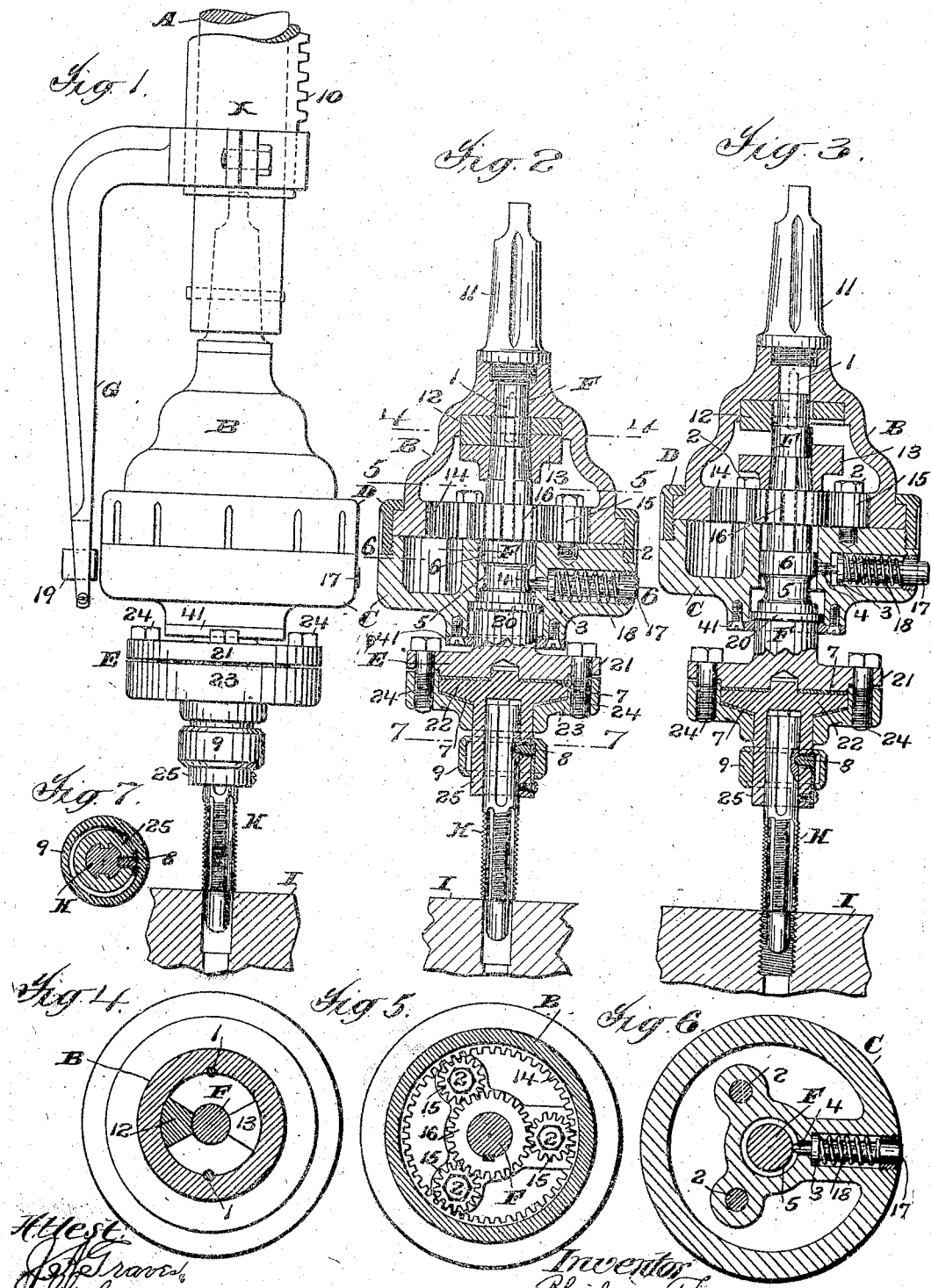

PHILIP THOMAS, OF NEW YORK, N. Y., ASSIGNOR OF ONE-HALF TO WILLIAM SCHWANHAUSSER, OF BROOKLYN, NEW YORK.

CHUCK.

No. 824,085.　　Specification of Letters Patent.　　Patented June 19, 1906.

Application filed January 23, 1904. Serial No. 190,273.

*To all whom it may concern:*

Be it known that I, PHILIP THOMAS, a citizen of the United States, residing at New York city, county of Kings, and State of New York, have invented certain new and useful Improvements in Chucks, fully described and represented in the following specification and the accompanying drawings, forming a part of the same.

This invention relates to an improved chuck adapted especially for machines used in boring, tapping, stud-setting, and for similar purposes, the object of the invention being to provide a simple, efficient, and durable construction by which the tool or tool-holder may be driven directly from the spindle during the work and quickly withdrawn from the work by reversal of the action of the chuck.

In the accompanying drawings there is shown a construction embodying all the features of the invention in their preferred form, and this construction will now be described in detail and the features forming the invention specifically pointed out in the claims.

In the drawings, Figure 1 is a side view of the chuck in position for work with the tool-holder clutched to the spindle. Fig. 2 is a central section of the chuck in the same position. Fig. 3 is a view similar to Fig. 2, but showing the chuck during withdrawal of the tool from the work. Figs. 4, 5, 6, and 7 are cross-sections on, respectively, the lines 4, 5, 6, and 7 of Fig. 2.

Referring to said drawings, A is the drill spindle or shaft, shown as mounted in the usual sleeve X, having the rack 10, by which the spindle is raised and lowered. To the lower end of the drill-spindle A is attached in the usual manner the shank 11 of the chuck, which shank is formed on or fixed to the upper part B of the body or casing of the chuck, which forms the tool-driving part or driver of the clutch, this driver B being connected to the lower part C of the body or casing of the chuck, which lower part forms a pinion-support by a screw-cap D taking over a shoulder on the part B and screwed onto the part C. The tool-holder E is carried by the tool-driving spindle F, which extends through the body of the chuck to the shank 11 and on which the chuck-body B C has longitudinal movement, so as to clutch the driver B to the tool-holder for direct driving of the latter during work and to unclutch the driver B from the tool-holder for reversing the rotation of the tool-holder and withdrawing the tool from the work.

The clutch construction and means for reversing the rotation of the tool-holder are as follows: One part 12 of a ring-clutch is formed on or secured to the inner side of the driver B at the top, so as to inclose the upper end of the spindle F, and the other part 13 of the clutch is fixed to the spindle F. The clutch-ring 12 is shown as made separate from the casing of driver B and secured thereto by pins 1, which are driven into holes formed partly in the clutch-ring and casing; but other means for securing the clutch-ring may be used. The driver B carries an internal gear 14, which through one or more intermediate pinions 15 (three being shown, as is preferred) drives gear 16, splined on the spindle F, the pinions 15 being shown as mounted on screw-studs 2, set into the lower part C of the chuck-body. The part C carries a stop 17, which passes through an opening to the outside of the chuck body or casing C, but is normally pressed inward within or even with the outer surface of the chuck-body by spring 18, which presses against a ring 3 on the stop, and the stop carries at its inner end a pin 4, adapted to enter a depression 5 in the spindle F to permit the stop 17 to be drawn in by the spring 18, and when it is forced out of the depression onto the ring 6 on spindle F forces the stop 17 outward, so as to project from the chuck-body. This stop 17 when thus projected engages a stop 19, carried by some suitable part of the machine, so as to move up and down with the chuck, and shown as carried by arm G, secured to and depending from sleeve X.

The spindle F is provided with a stop-ring 20, moving in a recess in the lower part of the body C, the shoulder at the upper end of the recess limiting the movement of the chuck-body B C in one direction, and the movement in the other direction being limited by the 41 closing the bottom of the recess, which is preferably made detachable, as shown, so that by removing this ring the tool-holder and spindle F may be withdrawn from the chuck.

The chuck, as above described, may be used with a tool-holder not provided with means for frictionally driving the tool, in which case the lower end of the tool-holder E will simply be suitably constructed for receiving and holding a tool. I prefer, however, to combine the novel features of my chuck with means for frictionally driving the tool, and such a construction is illustrated. In this construction the tool-holder is made in two parts 21 22, held together by a cap 23, friction-pieces 7, of suitable material, being used between the parts 21 22 and between the part 22 and the cap 23, and the parts of the tool-holder being adjustably secured together by screws 24, so that the pressure at which slip of the tool is permitted may be regulated as desired. The part 22 of the tool-holder carries the shank 25, which receives the tool H, shown as a screw-threading tap, and this tool is held in the tool-holder by a spring-catch 8 entering a notch in the tool-shank, which catch is locked to prevent withdrawal of the tool and unlocked by an eccentric sleeve 9 on shank 25.

The operation of the chuck will be understood from a brief description in connection with the drawings. Assuming that the parts are in the position shown in Fig. 3, with the chuck-body B C drawn into its upper position on the spindle F, so as to unclutch the chuck body from the spindle F, the chuck is now moved downward by the spindle A in the usual manner, and the pressure of the tool H against the work I as the tool strikes the latter holds the tool and tool-holder E against downward movement, and the chuck-body B C then moves downward on the shaft F into the position shown in Figs. 1 and 2, in which the clutch-rings 12 13 engage. This movement of the chuck-body B C also moves the pin 4 from the surface of the ring 6 to a position opposite the depression, and the stop 17 is drawn inward by spring 18, so that the stop 17 is released from engagement with the stop 19 and the lower part of the chuck-body C permitted to rotate with the driver B and spindle F. The chuck then rotates as a whole with the tool-holder E and tool H, the parts of the tool-holder slipping on each other to avoid damage to the tool or work when the end of the work is reached or the resistance otherwise in excess of the friction, there being no driving of the pinions 15 on gear 16 in this action, but all the gears being simply carried around in their fixed relative positions by the chuck-body.

When the work is done and the tool to be withdrawn, the shaft A and chuck-body B C are drawn upward on the spindle F, the tool-holder and spindle F being held downward by the work, and the clutch-rings 12 13 are thus unclutched to release the driver B from the spindle F, as shown in Fig. 3. This movement of the chuck-body also draws the stop 17 upward, so that the pin 4 moves out of the depression 5 onto the sleeve 6 on spindle F, and the stop is thus forced outward into position to engage the fixed stop 19, so that the part C of the chuck-body rotates with the driver B during a part of a rotation until the stop 17 engages the stop 19, and the part C then stops while the driver B continues to rotate with the shaft A. By this rotation of the driver B while the part C is held stationary the interior gear 14, through pinions 15 and gear 16, rotates the spindle F in the opposite direction to the movement of the driver B and shaft A and at a higher rate of speed, so that the tool H is thus reversed and quickly withdrawn from the work I, the position of the parts during withdrawal being clearly shown in Fig. 3. The tool having been withdrawn, the parts remain in the position shown in Fig. 3 until the tool is again moved down into contact with the work and the chuck-body B C clutched to the shaft F, as above described.

It is to be understood that the invention is not to be limited to the specific construction shown, but that modifications may be made in the form and arrangement of parts in the chuck illustrated, while retaining the features claimed.

What I claim is—

1. In a chuck, the combination with a tool-driving spindle, of a driver movable on the spindle toward and from the work, a clutch for connecting the driver to the spindle for direct driving of the latter and operated by the movement of the driver on the spindle to clutch and unclutch the driver and spindle, an internal gear actuated by the driver, a gear on the spindle, one or more pinions between the internal gear and spindle-gear, a support for said pinions rotating with the tool and driver when the parts are clutched, and means controlled by the movement of the driver on the spindle for holding the pinion-support stationary when the driver and spindle are unclutched.

2. In a chuck, the combination with a tool-driving spindle, of a driver movable on the spindle toward and from the work, a clutch for connecting the driver to the spindle for direct driving of the latter and operated by the movement of the driver on the spindle to clutch and unclutch the driver and spindle, an internal gear carried by the driver, a gear on the spindle, one or more pinions between the internal gear and spindle-gear, a pinion-support connected to the driver and moving toward and from the work therewith, a stop carried by the pinion-support, and a cam on the spindle controlling the stop to stop the pinion-support when the driver is moved into position for unclutching the driver and spindle and release the pinion-support when the parts are clutched.

3. The combination with the chuck-body having the driver B and the pinion-support C connected together to permit the driver B to rotate independently of the support C, of internal gear 14 on the driver B, pinion or pinions 15 carried by the support C, tool-holder spindle F within the chuck-body on which said body has a limited movement toward and from the work, gear 16 on the spindle F meshing with pinions 15, a clutch for connecting the spindle F to the driver B, controlled by the movement of the driver B toward and from the work, and means controlled by the movement of the driver on the spindle for holding the pinion-support C against rotation when the driver and spindle are unclutched and releasing it when the parts are clutched, substantially as described.

4. The combination with the chuck-body having the driver B and the pinion-support C connected together to permit the driver B to rotate independently of the support C, of internal gear 14 on the driver B, pinion or pinions 15 carried by the support C, tool-holder spindle F within the chuck-body on which said body has a limited movement toward and from the work, gear 16 on the spindle F meshing with pinions 15, a clutch for connecting the spindle F to the driver B, controlled by the movement of the driver B toward and from the work, stop 17 carried by the support C and adapted to engage a stationary stop when advanced, and means for advancing and retracting the stop by the clutching and unclutching movement, substantially as described.

5. The combination with the chuck-body having the driver B and the pinion-support C connected therewith to permit the driver B to rotate independently of the support C, of internal gear 14 on the driver B, pinion or pinions 15 carried by the support C, tool-holder spindle F within the chuck-body on which said body has a limited movement toward and from the work, gear 16 on the spindle F meshing with pinions 15, a clutch for connecting the spindle F to the driver B controlled by the movement of the driver B toward and from the work, stop 17 carried by the tool-support, spring 18 and a cam-surface on the tool-spindle for advancing and retracting the stop, and fixed stop 19 engaging the stop 17 when advanced, substantially as described.

6. The combination with the chuck-body parts B, C, of the holding-collar D, an internal gear and pinions carried by the respective parts B, C, tool-spindle F within the body B, C, gear 16 movable on said spindle, said spindle and body being movable relatively to each other for clutching and unclutching, clutch members 12, 13 carried by the part B and the tool-spindle, and a stop brought into action by the unclutching movement for holding the part C stationary when the clutch members are disengaged, substantially as described.

7. In a tool-holder the combination of a rotary case and a sleeve movable axially one with relation to the other and provided with gears and with clutch members adapted to be engaged and disengaged by the axial movement of one part relative to the other, an independently-rotatable ring carrying a pinion in mesh with said gears, a stationary part and means operated by the endwise movement of one part of the holder relative to the other for locking said ring to and releasing it from said stationary part, substantially as described.

8. In a tool-holder the combination of an internally-toothed case, provided with a clutch member and an externally-toothed sleeve movable axially in said case and provided with a clutch member adapted to be engaged with and disengaged from that in said case by the axial movement of one part with relation to the other, a stationary member, a ring interposed between said case and sleeve and carrying one or more pinions in mesh with the gear-teeth thereof and provided with one or more dogs operated by the endwise movement of said sleeve to lock said ring to and release it from said stationary member, substantially as described.

In testimony whereof I have hereunto set my hand in the presence of two subscribing witnesses.

PHILIP THOMAS.

Witnesses:
W. H. KENNEDY,
J. A. GRAVES.